March 4, 1952  N. CORDIS  2,587,598
APPARATUS FOR MIXING MANURE AND DRY FERTILIZERS
Filed Nov. 1, 1947

Inventor:
Nat Cordis
By:
William S. Norelburg Jr.
Attorney

Patented Mar. 4, 1952

2,587,598

UNITED STATES PATENT OFFICE 2,587,598

APPARATUS FOR MIXING MANURE AND DRY FERTILIZERS

Nat Cordis, Silver Lake, Wis.

Application November 1, 1947, Serial No. 783,549

3 Claims. (Cl. 259—2).

This invention relates to fertilizers, and particularly to apparatus for preparing a fertilizer consisting principally of barn refuse.

In my copending application, Ser. No. 746,289, I have disclosed barn cleaning apparatus comprising suitable conveyors arranged to move barn refuse in a trough in a barn floor to a pit, and from the pit outside of the barn to a spreader. It has been the practice of farmers to drive their spreaders over the land and to distribute the refuse as one of the fertilizing materials to be put on the land. Other fertilizers, for example commercial phosphate, lime, etc., which are used in combination with the refuse and preferably in suitable proportion therewith are also dispensed by the farmer with little, if any, means of controlling the amount or proportion. It is customary for him in a separate operation to spread a commercial fertilizer on to the same land in about the proportion he believes would be proper.

It is an object of this invention to provide means whereby the fertilizer, which comprises principally refuse, can be mechanically admixed in proportion with other suitable fertilizers prior to the loading of the refuse on a spreader so as to eliminate the double effort now resulting. It is a further object of this invention that such apparatus shall operate in combination with my barn cleaning apparatus so that there is no unnecessary handling of materials, and thus a real saving of labor is obtained. Further objects and advantages of my invention will be apparent from the following description thereof.

Broadly, I obtain the aforesaid objects by positioning immediately over the refuse pit of my barn cleaning system a fertilizer dispenser. This dispenser comprises a hopper and a measuring box whereby measured quantities of fertilizers are spread among the refuse collecting in the pit as the refuse is picked up by the elevator of my barn cleaning system for removal to the spreader. Preferably, the fertilizer dispenser includes an agitator and a suitable valve mechanism which are driven by the mechanism driving my barn cleaning conveyor so that the quantity of fertilizer dispensed bears a relationship to the amount of refuse being discharged.

My invention will be better understood by reference to the attached drawings forming a part hereof wherein like parts bear like numerals and wherein.

Figure 1:
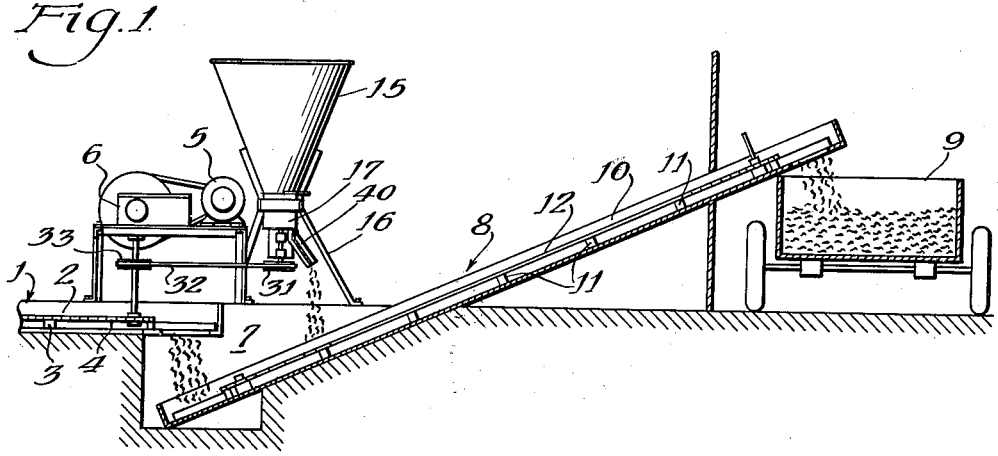
Fig. 1 is a diagrammatic view partially in true elevations showing a preferred arrangement of my fertilizer preparation apparatus.

In the drawings, a barn floor conveyor 1, as for example, the conveyor shown in my pending application Serial No. 746,289, carries refuse in a trough 2 by means of paddles 3 secured to a chain 4. The conveyor is driven by a motor 5 acting through a transmission 6. The refuse is preferably discharged from the conveyor into a pit 7 from which it is then conveyed, preferably upwardly by an elevator or second conveyor 8, to a conventional spreader 9 outside the barn. In some instances, the floor conveyor may discharge the refuse directly on the spreader. The elevator, when used, may also be of the type shown in my aforementioned application comprising a trough 10 in which travel a plurality of paddles 11 secured to an endless chain 12. The chain may be driven by a motor (not shown). One end of the elevator is positioned in the pit beneath the floor conveyor 1 so as to directly receive refuse from the conveyor.

To modify the refuse by the addition of other fertilizer, I provide means, preferably positioned above the pit 7, elevator 8, or other place of discharge from the conveyor 1, comprising a hopper 15 supported on a suitable frame 16. At the base of the hopper is a measuring box 17 within which is valve means 18 for controlling the discharge of fertilizer from the hopper and particularly the rate or quantity discharged.

The measuring box and valve means in my preferred form comprises a cylindrical chamber 20, the top 21 of which serves as the base of the hopper 15. Openings 22 and 23 are provided in the top and bottom of the chamber and are preferably in axial alignment. The valve means 18 within chamber 20, includes a pair of circular members or gates 24 and 25 which are secured on a shaft 26 by pins 27. The shaft is rotatably journalled in the ends of the chamber 20 as well as bearings 28 and 29 carried on a bracket 30. The shaft is preferably driven through pulley 31 by belt 32 and pulley 33 by the motor 5.

Openings 35 and 36 in members 24 and 25 respectively are preferably of the same size and shape as the openings 22 and 23, but are out of axial alignment. By so positioning the various openings relative to each other, fertilizer will flow from the hopper into the chamber 23 when openings 22 and 35 are in register, and will flow out of the chamber when openings 23 and 36 are in register. Hence, rotation of the shaft 29 alternately opens and closes the openings whereby measured amounts of fertilizer are discharged from the hopper to the elevator.

Since the rate of operation of the valve means is controlled by the rate of travel of the floor conveyor, I obtain some degree of proportioning of the commercial fertilizer and the refuse. This is an important feature since once admixed it would be harmful to the land if too much commercial fertilizer were to be concentrated in any area.

Figures 2, 3, 4:
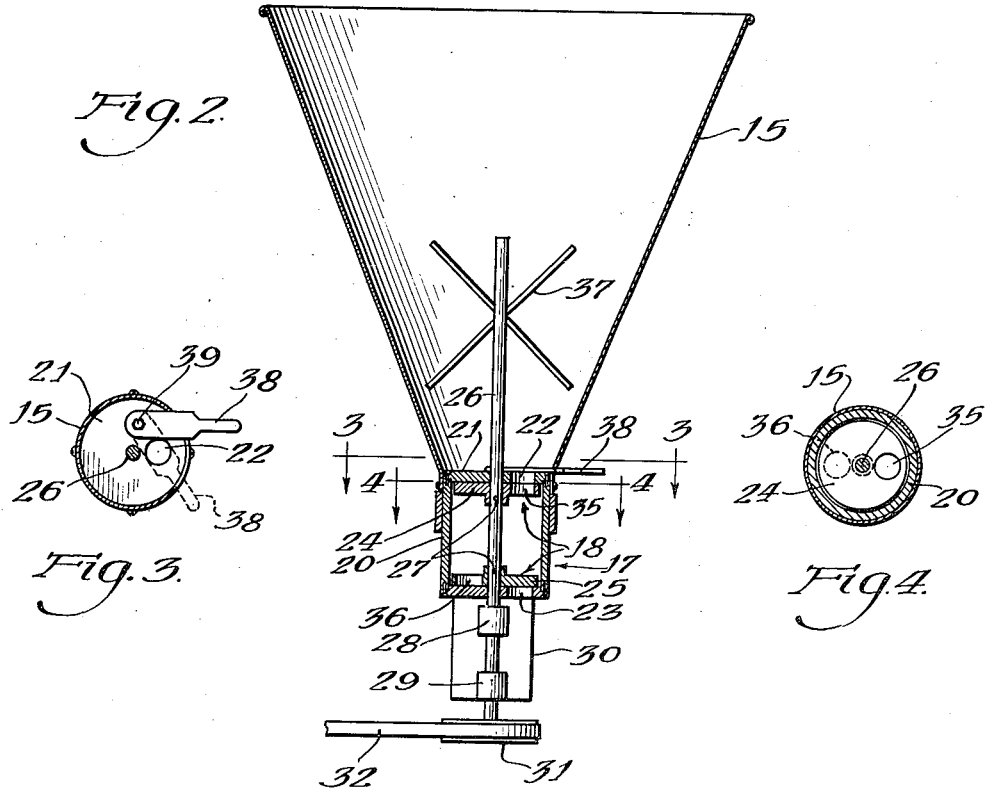
Fig. 2 is a vertical section through my fertilizer dispenser.
Fig. 3 is a section taken along the line 3—3 of Fig. 2.
Fig. 4 is a section taken along the line 4—4 of Fig. 2.

To insure a smooth flow of fertilizer from the hopper, I provide an agitator 37. I further provide a manually controlled valve 38, Fig. 3, which is pivotally mounted on a pin 39 so as to be swingable to a position overlying opening 22. This valve permits cutting off the supply of fertilizer independently of the floor conveyor. To better direct the fertilizer being discharged, I provide a chute 40 fixed to the box 17 directly beneath opening 23.

The above is a description of a preferred modification of my apparatus and other modifications will occur to those skilled in the art; therefore, no limitations are intended thereby except such as are contained in the following claims.

I claim:

1. An apparatus for dispensing aliquot portions of a pulverant material comprising a hopper, a segregated measuring chamber beneath said hopper, said measuring chamber having upper inlet and lower discharge openings, a rotatable shaft extending into the bottom of the hopper and through said measuring chamber, a pair of vertically spaced rotary valve members carried on said shaft within said chamber adapted to alternately open and close said inlet and discharge openings, a closure plate extending between the superimposed hopper and the inlet of said measuring chamber for manually controlling the flow of pulverant solids from said hopper into said measuring chamber, agitation means on said shaft within said hopper for agitating the pulverant solids in a lower portion of said hopper, and means on the lower end of said shaft adapted to drive said rotary valve members and said agitation means through said shaft.

2. An apparatus for mixing manure and dry fertilizers comprising an endless manure conveyor traveling within a trough in a barn floor behind a row of stalls, a manure collection hopper in the path of said conveyor below said trough, a drive sprocket for said conveyor adjacent said hopper, a vertical drive shaft for said sprocket, a power means for rotating said drive shaft, a driven shaft parallel to said drive shaft, a first pulley on said drive shaft intermediate said power means and said sprocket, a reservoir of dry pulverant fertilizer, a rotatable valve means for discharging dry fertilizer from said reservoir, said valve being rotated by a second pulley fixed to said driven shaft, and a belt drive between said first pulley and said second pulley, whereby the discharge of pulverant fertilizer for admixture with said manure in said hopper is controlled by the speed of the endless conveyor delivering manure into said hopper from said trough.

3. An apparatus for mixing manure and dry fertilizers comprising an endless manure conveyor traveling within a trough in a barn floor behind a row of stalls, a manure collection hopper in the path of said conveyor below said trough, a drive sprocket for said conveyor adjacent said hopper, a vertical drive shaft for said sprocket, a power means for rotating said drive shaft, a driven shaft parallel to said drive shaft, a power take-off on said drive shaft intermediate said power means and said sprocket, a reservoir of dry pulverant fertilizer, a rotatable valve means for discharging dry fertilizer from said reservoir, an agitator on said driven shaft within said reservoir, and a drive coupling means between the power take-off on said drive shaft and said driven shaft, whereby the discharge of pulverant fertilizer by said valve means for admixture with said manure in said hopper is controlled by the speed of the endless conveyor delivering manure into said hopper from said trough.

NAT CORDIS.

REFERENCES CITED

The following references are of record in the file of this patent:

UNITED STATES PATENTS

| Number | Name | Date |
|---|---|---|
| 711,632 | Johnson | Oct. 21, 1902 |
| 1,036,327 | Pickett | Aug. 20, 1912 |
| 1,088,096 | Rossow | Feb. 24, 1914 |
| 1,101,478 | Townsend | June 23, 1914 |
| 1,193,581 | Mansbendel | Aug. 8, 1915 |
| 1,313,892 | Hepler | Aug. 26, 1919 |
| 2,244,442 | Blauvelt | June 3, 1941 |
| 2,250,968 | Riendeau | July 29, 1941 |
| 2,285,765 | Carswell | June 9, 1942 |